United States Patent [19]

Johnson et al.

[11] Patent Number: 5,707,578
[45] Date of Patent: Jan. 13, 1998

[54] METHOD FOR MAKING MOLD INSERTS

[75] Inventors: Gary W. Johnson; Joseph P. Myers; Mark A. Perrotto, all of Loveland, Colo.

[73] Assignee: Hach Company, Loveland, Colo.

[21] Appl. No.: 664,344

[22] Filed: Jun. 14, 1996

[51] Int. Cl.⁶ ............................ B29C 33/40; B29C 35/08; B29C 41/02
[52] U.S. Cl. ............................................. 264/401; 264/227
[58] Field of Search ........................................ 264/227, 401

[56] References Cited

U.S. PATENT DOCUMENTS

| | | | |
|---|---|---|---|
| 4,844,144 | 7/1989 | Murphy et al. | 264/401 X |
| 5,435,959 | 7/1995 | Williamson et al. | 264/227 X |
| 5,439,622 | 8/1995 | Pennisi et al. | 264/401 |
| 5,562,846 | 10/1996 | McKeen | 264/401 X |

*Primary Examiner*—Leo B. Tentoni
*Attorney, Agent, or Firm*—Dean P. Edmundson

[57] ABSTRACT

A method for preparing plastic injection mold inserts capable of forming a three-dimensional article in a plastic injection molding process. The method includes (a) forming a master mold insert having a recess therein which has a shape which is complementary to at least a portion of the shape of the three-dimensional article; (b) preparing a temporary reverse mold of the master mold insert; (c) positioning a metal gate in the reverse mold adjacent to and in contact with the article form; (d) introducing a hardenable plastic resin into the reverse mold; (e) allowing the resin to harden to form a mold insert; and (f) removing the mold insert from the reverse mold.

14 Claims, 9 Drawing Sheets

METHOD FOR MAKING MOLD INSERTS

FIELD OF THE INVENTION

This invention relates to techniques and methods for making molds or mold inserts for plastic injection molding. More particularly, this invention relates to methods for making mold inserts for use in plastic injection molding processes.

BACKGROUND OF THE INVENTION

In order to produce a three-dimensional article in a typical plastic injection molding process, it is necessary to prepare a mold cavity insert which has a shape which is complementary to the desired shape of the three-dimensional article. The mold cavity insert is normally machined out of steel or other metal which is capable of withstanding high temperature and pressure when hot liquid plastic resin is injected into the mold.

The time and skill required to prepare the mold cavity insert are both very significant. The machining must be done very carefully with great precision by skilled craftsmen.

There has not heretofore been provided a simple and rapid method for making a mold insert which can be used in high-pressure injection molding.

SUMMARY OF THE PRESENT INVENTION

In accordance with the present invention there is provided a simple, rapid and inexpensive method for preparing a plastic injection mold cavity insert which is capable of forming a three-dimensional article in a plastic injection molding process. In one embodiment the method comprises the steps of:

(a) providing a master mold insert;

(b) preparing a temporary reverse mold of said master mold insert; wherein said reverse mold comprises a three-dimensional form of an article;

(c) positioning a metal gate in said reverse mold adjacent to and in contact with said article form;

(d) introducing a hardenable plastic resin into said reverse mold;

(e) allowing said resin to harden to form a mold cavity insert; and (f) removing said mold cavity insert from said reverse mold.

The method enables a mold cavity insert to be prepared in a very short period of time. There is no need to utilize time consuming and expensive machining processes or equipment in order to prepare a mold cavity insert.

Other advantages of the invention will be apparent from the following detailed description and the accompanying drawings.

BRIEF DESCRIPTION OF THE DRAWINGS

The invention is described in more detail hereinafter with reference to the accompanying drawings, wherein like reference characters refer to the same parts throughout the several views and in which.

DETAILED DESCRIPTION OF INVENTION

Figure 1:
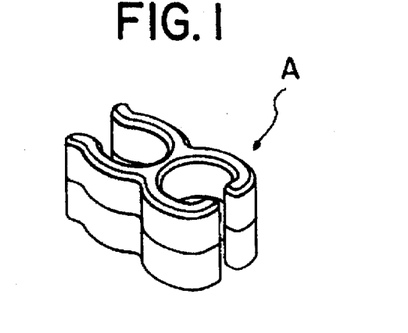
FIG. 1 is a perspective view of a three-dimensional article for which a mold cavity insert is prepared using the method of the present invention.

In FIG. 1 there is shown a perspective view of a three-dimensional article A which can be produced by plastic injection molding techniques using the mold inserts provided in accordance with the method of this invention.

Figure 2:
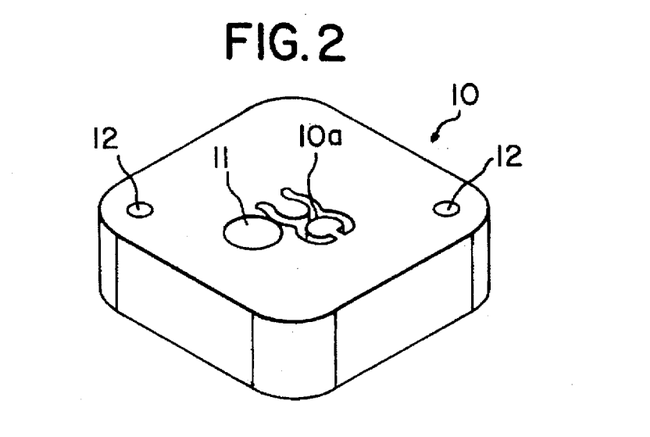
FIG. 2 is a perspective view of the master mold of the top half ("A" half) mold insert which includes a recess corresponding to the shape of the upper half of the article of FIG. 1 to be replicated.
Figures 3, 4:
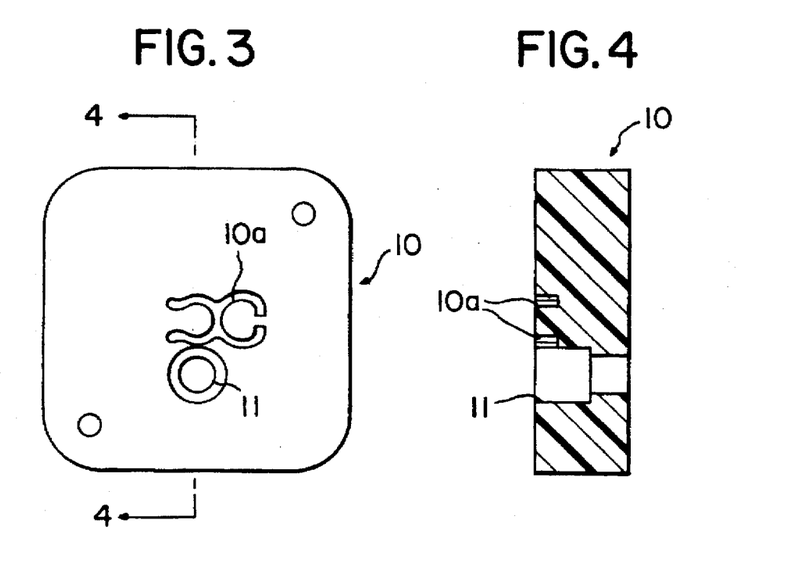
FIG. 3 is a top view of the mold of FIG. 2.
FIG. 4 is a cross-sectional view of the mold taken along lines 4—4 in FIG. 3.

FIGS. 2–4 show the top half ("A" half) of a master mold insert 10 which includes a recess 10A corresponding to the shape of the upper half of the article of FIG. 1. The master mold 10 also includes an opening or recess 11 for the placement of a metal runner and gate which will be included in the final mold insert. The mold also includes threaded openings 12 for receiving threaded bolts.

Figure 5:
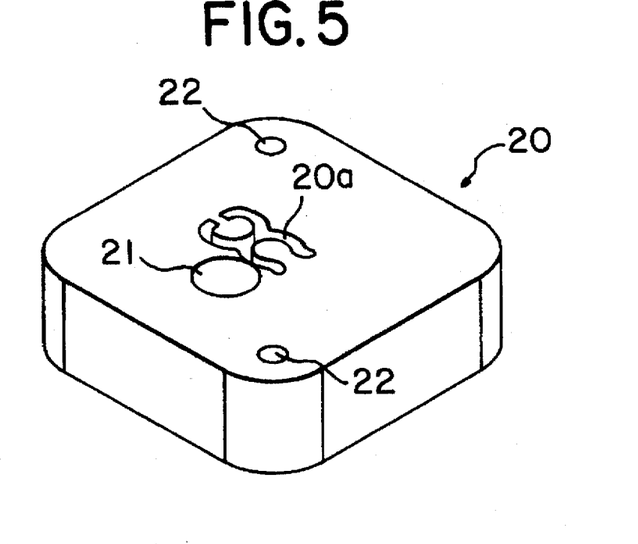
FIG. 5 is a perspective view of the master mold of the bottom half ("B" half) mold insert which includes a recess corresponding to the shape of the bottom half of the article to be replicated.
Figure 6:
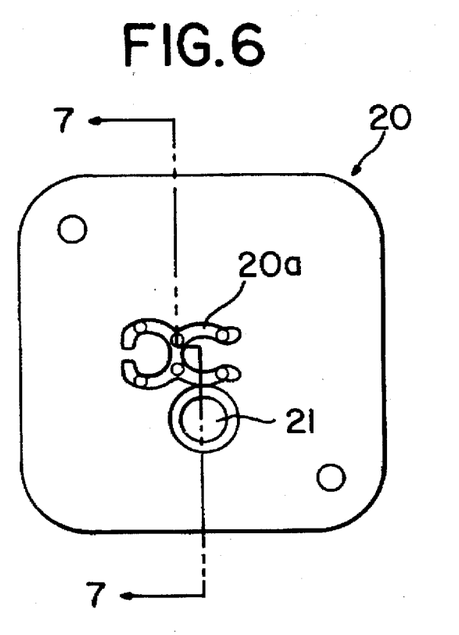
FIG. 6 is a top view of the mold of FIG. 5.
Figure 7:
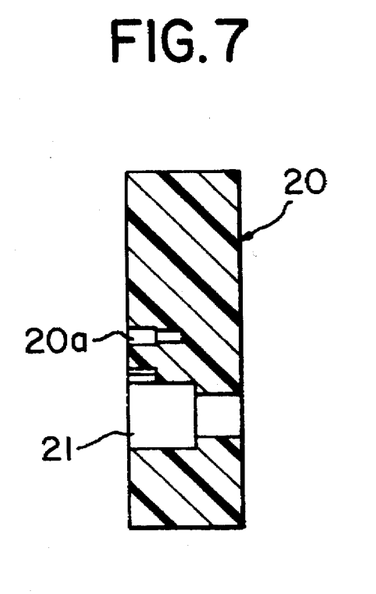
FIG. 7 is a cross-sectional view of the mold of FIG. 6 taken along lines 7—7 in FIG. 6.

FIGS. 5–7 show the bottom half ("B" half) of a master mold insert 20 which includes a recess 20A corresponding to the shape of the bottom half of the article to be replicated. The master mold also includes an opening or recess 21 for the placement of a metal runner and gate which will be included in the final mold insert. The mold also includes threaded openings 22 for receiving threaded bolts.

The mold inserts 10 and 20 may be prepared using conventional techniques. A preferred manner of preparation is by way of the technique known as stereolithography whereby a computer image of the desired mold insert controls the path of a laser beam which cures a liquid resin in this successive layers to reproduce the desired mold insert pattern.

Figure 8:
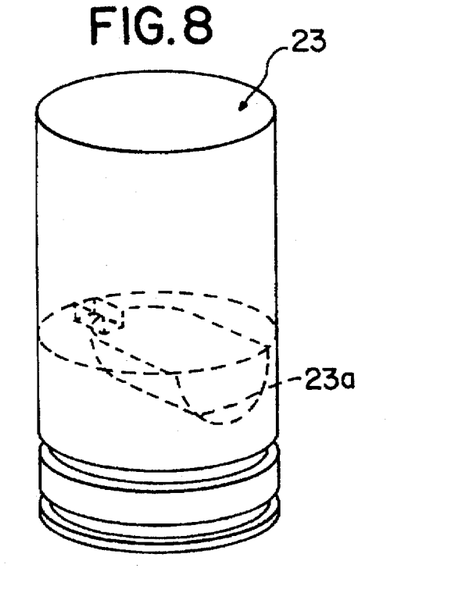
FIG. 8 is a perspective view of a metal runner and gate precursor 23 which is to be included in the finished mold insert for the bottom half of the mold.
Figure 8A:
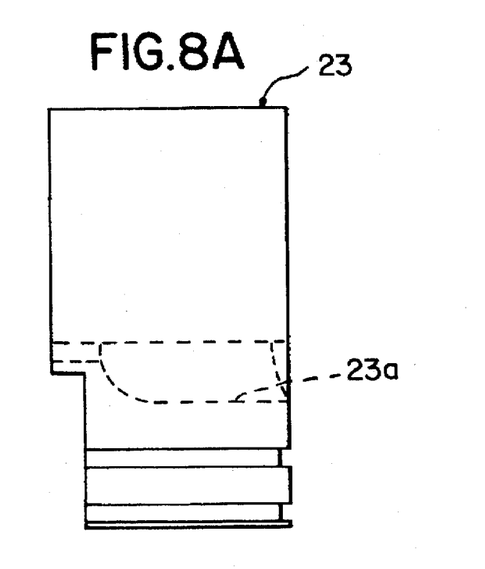
FIG. 8A is a side elevational view of the metal runner and gate precursor 23 of FIG. 8.

FIGS. 8 and 8A are perspective and side elevational views, respectively, of a metal runner and gate precursor 23 which is to be included in the bottom half of the final mold insert. The entire precursor 23 is included in the mold insert, after which the upper portion of the precursor is ground away in order to form the recess shown in dotted lines 23A, which is the runner and gate. The purpose of the metal runner and gate is to direct the molten plastic resin into the mold insert.

Figure 9:
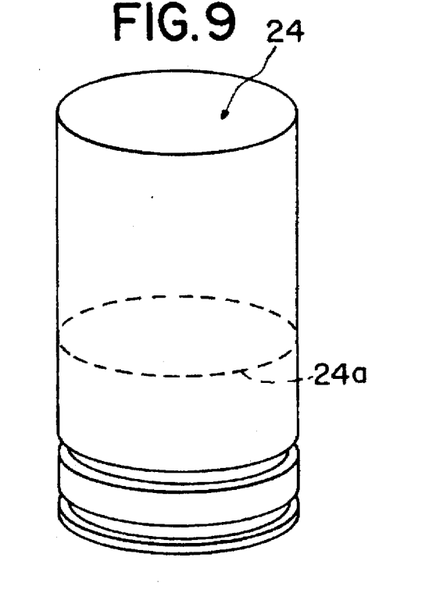
FIG. 9 is a perspective view of a metal runner and gate precursor 24 which is to be included in the finished mold insert for the top half of the mold.
Figure 9A:
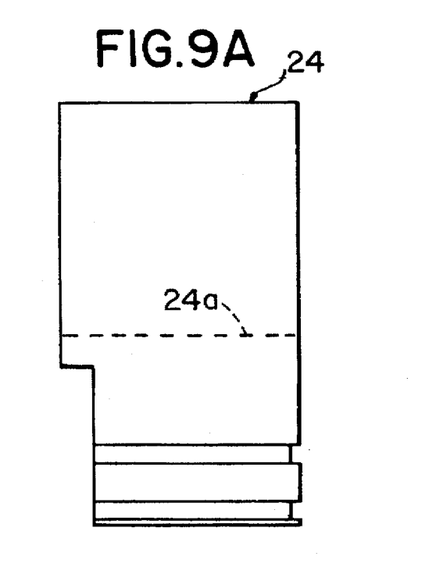
FIG. 9A is a side elevational view of the metal runner and gate precursor of FIG. 9.

FIGS. 9 and 9A are perspective and side elevational views, respectively, of a metal runner and gate precursor 24 which is to be included in the bottom half of the final mold insert. The entire precursor 24 is included in the mold insert, after which the upper portion of the precursor is ground away down to the level indicated by dotted line 24A.

Figure 10:
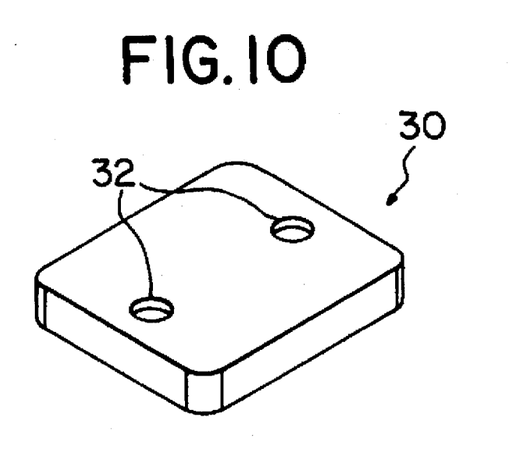
FIG. 10 is a perspective view of the bottom ejector plate.
Figure 11:
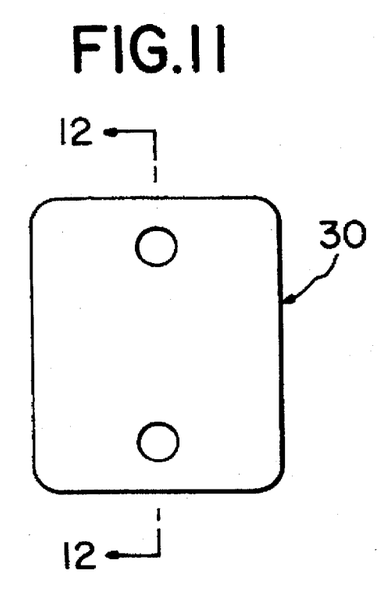
FIG. 11 is a top view of the bottom ejector plate.
Figure 12:
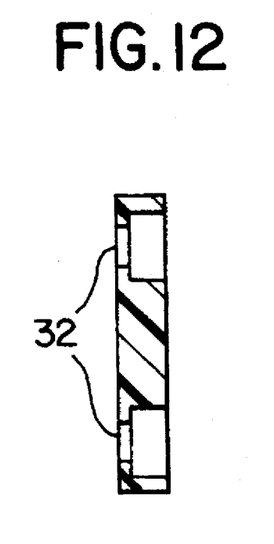
FIG. 12 is a cross-sectional view of the ejector plate of FIG. 11 taken along line 12—12.

FIGS. 10-12 show the bottom ejector plate 30 which include openings 32 for screws to secure plate 30 in the mold assembly.

Figure 13:
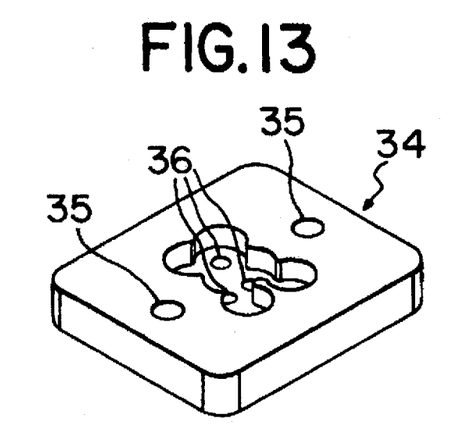
FIG. 13 is a perspective view of the top ejector plate.
Figure 14:
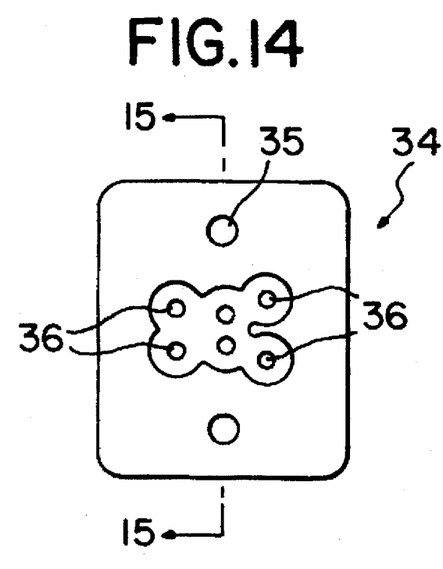
FIG. 14 is a bottom view of the top ejector plate.
Figure 15:
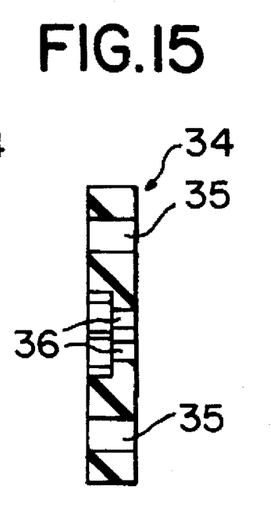
FIG. 15 is a cross-sectional view of the ejector plate of FIG. 14 taken along line 15—15.

FIGS. 13-15 show the top ejector plate 34 which is to be included in the mold assembly. The ejector plate includes openings 35 for screws to secure the plate in the mold assembly. The plate also includes ejector pin openings 36. The ejector pins are included in the final mold assembly (shown in FIG. 19A) for ejecting a molded article from the mold cavity insert.

Figure 16:
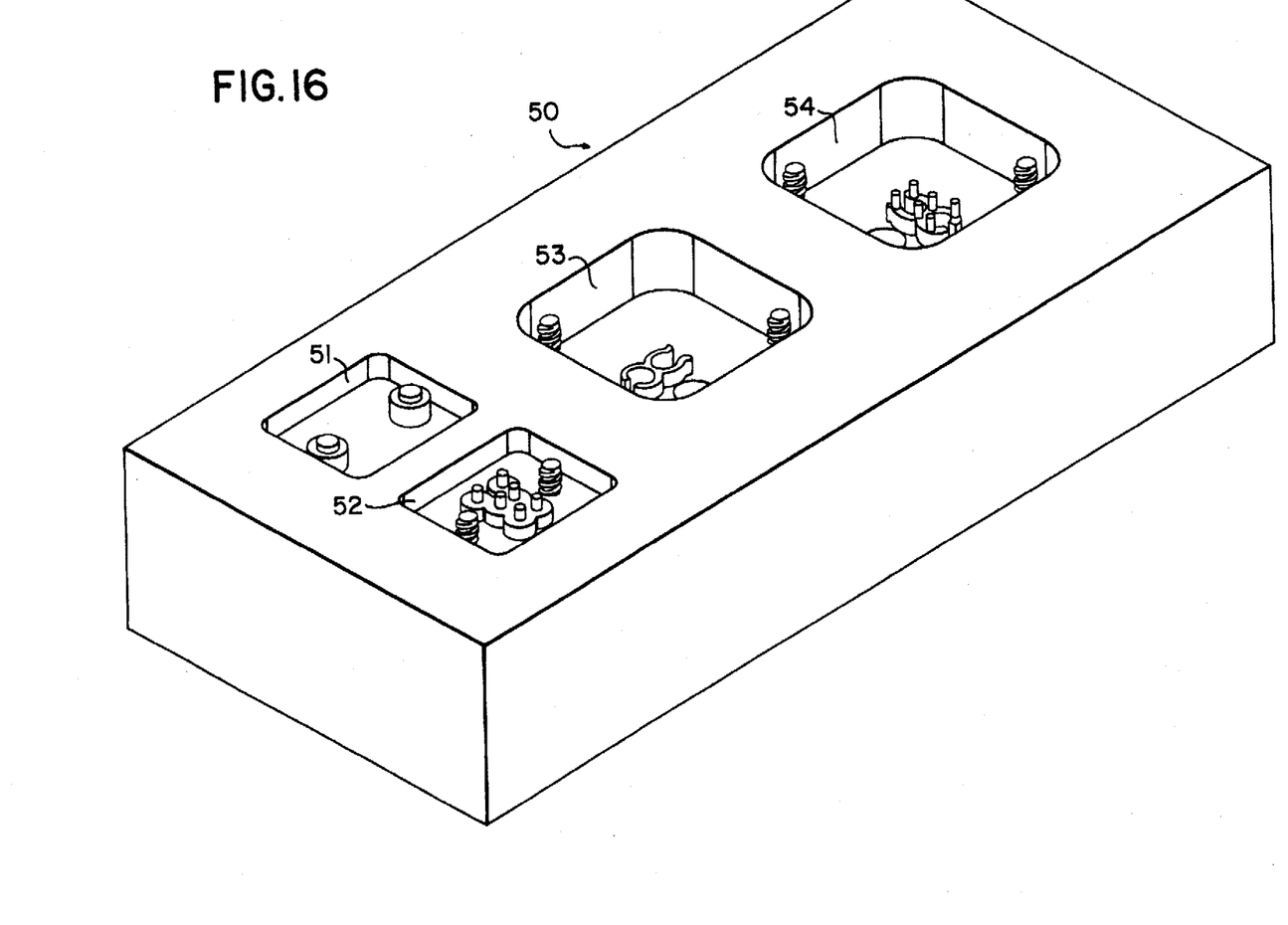
FIG. 16 is a perspective view of a mold having recesses corresponding to the shapes of the desired mold inserts.
Figure 17:
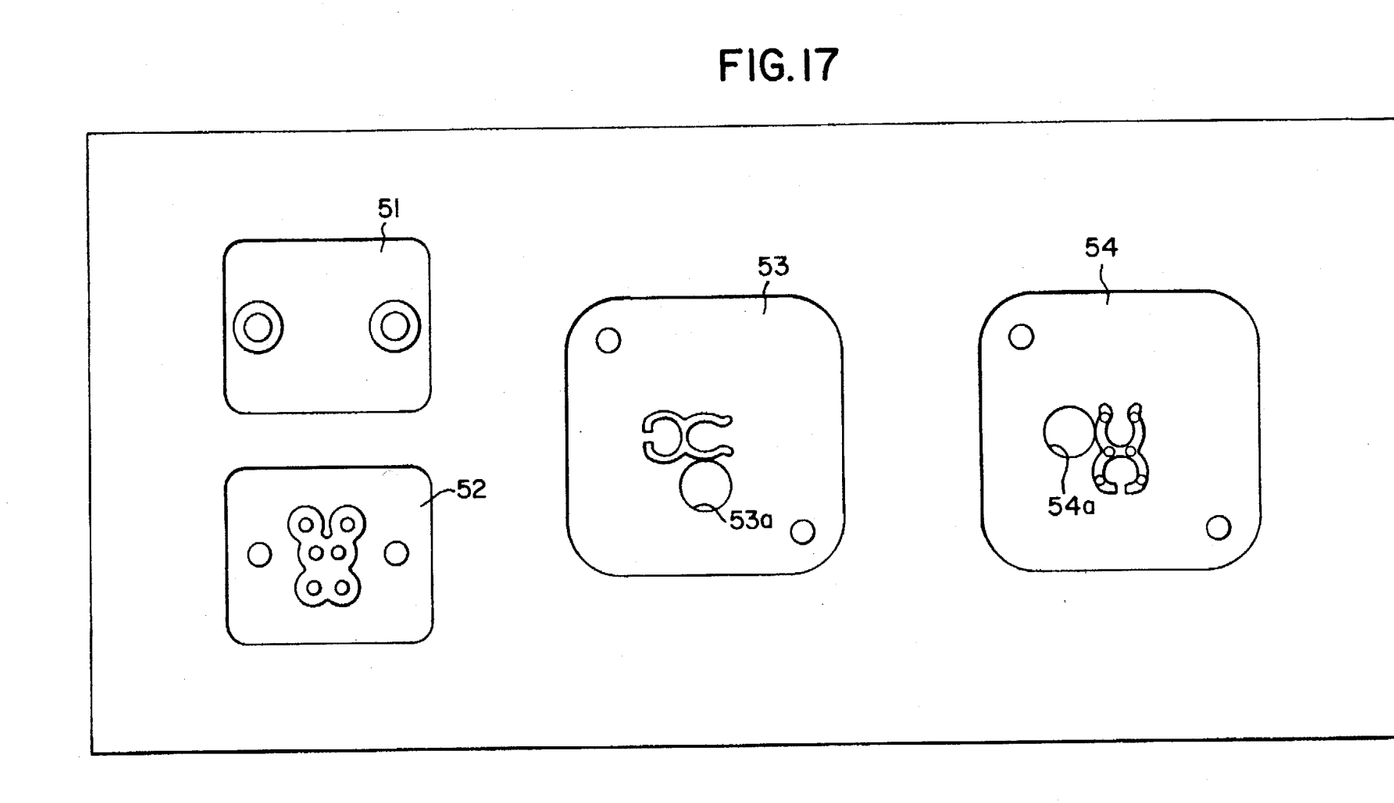
FIG. 17 is a top view of the mold of FIG. 16.

FIG. 16 is a perspective view of a temporary or reverse mold 50 which is composed of silicone rubber and which includes recesses 51, 52, 53 and 54 in its top face. Recess 51 is the reverse of the ejector plate 30, recess 52 is the reverse of the ejector plate 34, recess 53 is the reverse of master mold insert 10, and recess 54 is the reverse of master mold insert 20. Opening 53A in recess 53 is formed by inserting a metal pin in opening 11 in master mold 10. Opening 54A in recess 54 is formed by inserting a metal pin in opening 21 is master mold 20. FIG. 17 is a top view of the mold of FIG. 16.

Epoxy resin or other plastic hardenable resin is placed into the recesses of the reverse mold 50. After hardening of the resin, the ejector plates and mold inserts are removed from the recesses.

Figure 18:
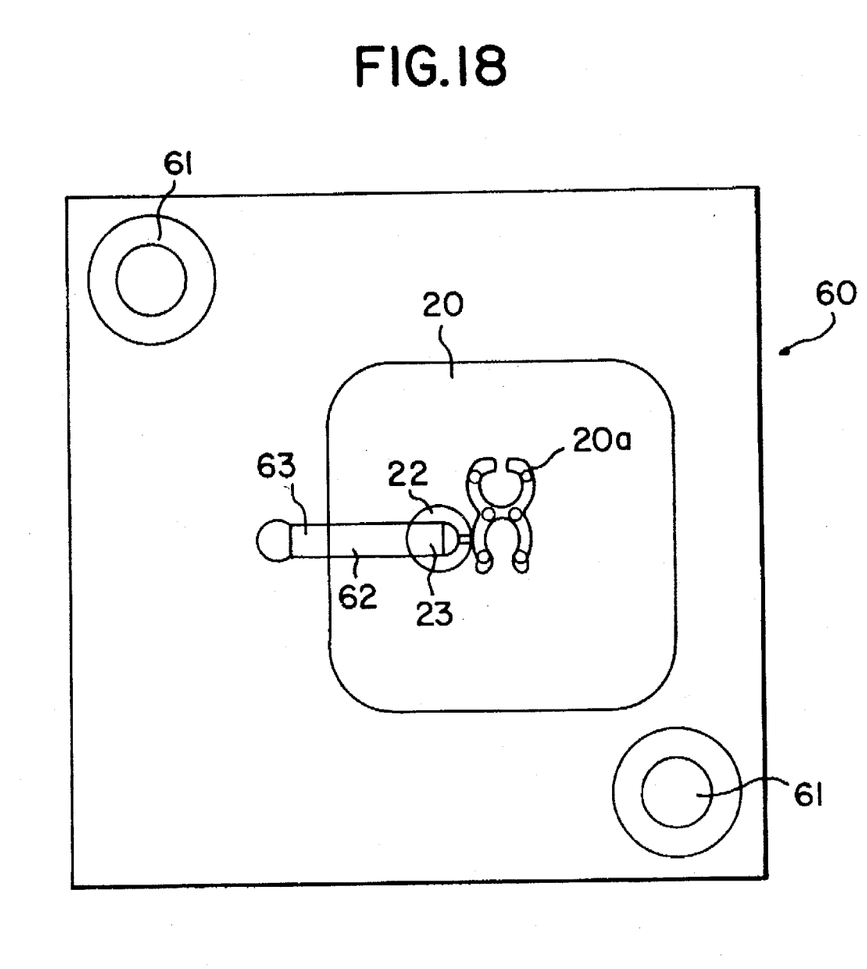
FIG. 18 is a top view of the "B" half (bottom) of the mold assembly including mold insert of FIGS. 5–7.

FIG. 18 is a top view of the bottom half of the final mold assembly which includes the mold insert 20 of FIGS. 5-7.

Openings 61 are for receiving locator pins. Runner 62 in the top surface of the mold insert 20 and runner 62 in the top surface of the bottom half of the mold are for guiding molten plastic resin from sprue 63 to the mold cavity 10A (upper half) and mold cavity 20A (bottom half).

Figure 19:
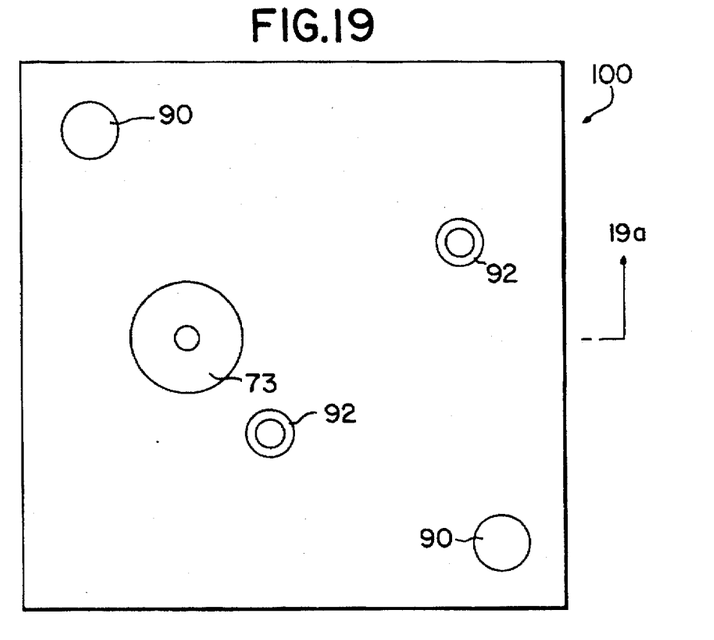
FIG. 19 is a top view of the "A" half of the final mold assembly.

FIG. 19 is a top view of the top half of the final mold assembly. Openings 90 are for locator pins. Openings 92 are for screws which secure the top half of the mold assembly to the bottom half of the mold assembly. The molten plastic resin is forced into the mold through openings 73, down through the vertical opening 72, and into through the runners 63 and 62 to the mold inserts.

Figure 19A:
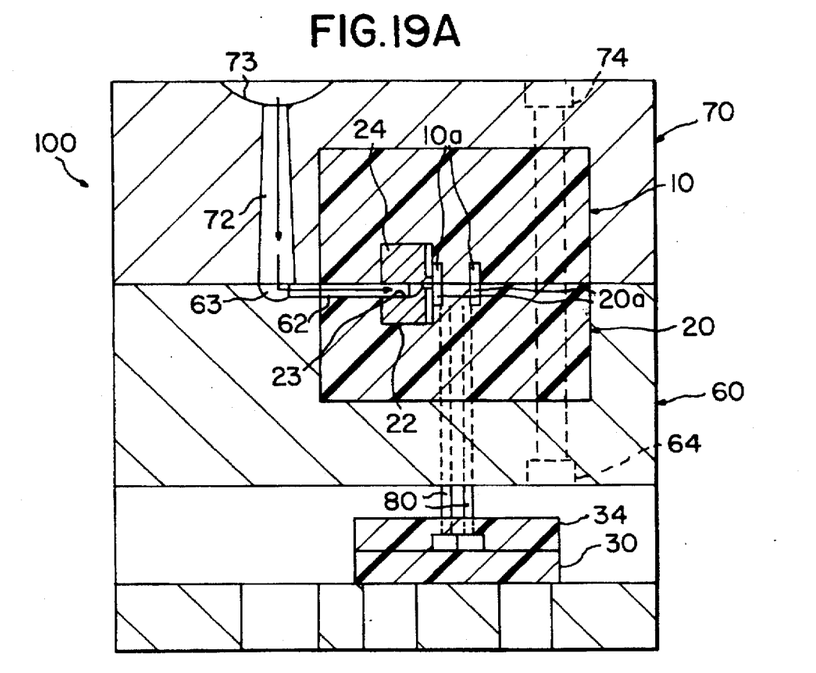
FIG. 19A is a cross-sectional view of the mold assembly of FIG. 19.

FIG. 19A is a cross-sectional view of the final mold assembly of FIG. 19. Openings 74 (in the upper half of the mold assembly) and 64 (in the bottom half of the mold assembly) are for receiving screws to hold the upper and lower halves together. Ejector pins 80 extend from the ejector plates 30 and 34 through the bottom half of the mold assembly to the mold cavity 20A. After the plastic article has been formed and cooled slightly in the mold cavity, the ejector pins are raised upwardly to force the formed article out of the mold cavity.

Other variants are possible without departing from the scope of this invention.

What is claimed is:

1. A method for preparing a plastic injection mold cavity insert, the method comprising the steps of:
   (a) providing a master mold insert;
   (b) preparing a temporary reverse mold of said master mold insert; wherein said reverse mold comprises a three-dimensional form of an article;
   (c) positioning a metal gate in said reverse mold adjacent to and in contact with said three dimensional form of an article;
   (d) introducing a hardenable plastic resin into said reverse mold;
   (e) allowing said resin to harden to form a mold cavity insert; and
   (f) removing said mold cavity insert from said reverse mold.

2. A method in accordance with claim 1, wherein said reverse mold is composed of silicone rubber.

3. A method in accordance with claim 1, wherein said hardenable plastic resin comprises epoxy resin.

4. A method in accordance with claim 1, wherein said metal gate comprises an upstanding column having an upper end and a lip projecting outwardly from said upper end.

5. A method in accordance with claim 4, wherein said lip portion includes an outer edge and an opening extending through said outer edge.

6. A method in accordance with claim 1, wherein said reverse mold includes a cavity with a generally flat base portion, and wherein said three-dimensional form is supported on, and is integral with, said base portion.

7. A method in accordance with claim 1, wherein said master mold insert is formed by means of stereolithography.

8. A method for preparing a plastic injection mold cavity insert capable of forming a three-dimensional article in a plastic injection molding process, the method comprising the steps of:
   (a) forming a master mold insert having a recess therein which has a shape which is complementary to at least a portion of the shape of said three-dimensional article;
   (b) preparing a temporary reverse mold of said master mold insert; wherein said reverse mold comprises a three-dimensional form of said portion of said article;
   (c) positioning a metal gate in said reverse mold adjacent to and in contact with said three-dimensional form;
   (d) introducing a hardenable plastic resin into said reverse mold;
   (e) allowing said resin to harden to form a mold cavity insert; and
   (f) removing said mold cavity insert from said reverse mold.

9. A method in accordance with claim 8, wherein said reverse mold is composed of silicone rubber.

10. A method in accordance with claim 8, wherein said hardenable plastic resin comprises epoxy resin.

11. A method in accordance with claim 8, wherein said metal gate comprises an upstanding column having an upper end and a lip projecting outwardly from said upper end.

12. A method in accordance with claim 8, wherein said lip portion includes an outer edge and an opening extending through said outer edge.

13. A method in accordance with claim 8, wherein said reverse mold includes a cavity with a generally flat base portion, and wherein said three-dimensional form is supported on, and is integral with, said base portion.

14. A method in accordance with claim 8, wherein said master mold insert is formed by means of stereolithography.

* * * * *